US008099875B2

(12) United States Patent
Basile et al.

(10) Patent No.: US 8,099,875 B2
(45) Date of Patent: Jan. 24, 2012

(54) METHOD AND SYSTEM FOR VERIFYING ALIGNMENT OF POWER TRANSMISSION PULLEYS

(75) Inventors: Jim M. Basile, Dundee, MI (US); Scott Willis, Gibraltar, MI (US); Joseph Skrobowski, New Boston, MI (US)

(73) Assignee: Ford Global Technologies, Dearborn, MI (US)

( * ) Notice: Subject to any disclaimer, the term of this patent is extended or adjusted under 35 U.S.C. 154(b) by 464 days.

(21) Appl. No.: 12/349,102

(22) Filed: Jan. 6, 2009

(65) Prior Publication Data

US 2010/0173736 A1   Jul. 8, 2010

(51) Int. Cl.
G01C 15/00 (2006.01)
G01D 21/00 (2006.01)
(52) U.S. Cl. ........ 33/286; 33/600; 33/DIG. 21; 356/399
(58) Field of Classification Search .................... 33/227, 33/228, 281, 282, 285, 286, 288, 600, 606, 33/611, 645, DIG. 21; 73/115.02, 115.03
See application file for complete search history.

(56) References Cited

U.S. PATENT DOCUMENTS

| | | | |
|---|---|---|---|
| 3,923,402 A | 12/1975 | Turcotte | |
| 5,144,487 A | 9/1992 | Hersey | |
| 5,987,762 A | 11/1999 | Toth et al. | |
| 6,031,616 A * | 2/2000 | Seiffert | 356/399 |
| 6,434,841 B1 | 8/2002 | Stahl et al. | |
| 6,539,638 B1 * | 4/2003 | Pelletier | 33/290 |
| 6,580,519 B1 * | 6/2003 | Wick | 356/614 |
| 6,751,879 B1 * | 6/2004 | Pu | 33/286 |
| 6,871,408 B2 * | 3/2005 | Malard et al. | 33/286 |
| 6,968,625 B2 | 11/2005 | Segerström et al. | |
| 2005/0268475 A1 | 12/2005 | Hobel et al. | |
| 2007/0028469 A1 * | 2/2007 | Nash et al. | 33/286 |

* cited by examiner

Primary Examiner — Amy Cohen Johnson
(74) Attorney, Agent, or Firm — Jerome R. Drouillard; Julia Voutyras

(57) ABSTRACT

A method and system for verifying the spatial and coplanar alignment of a number of power transmission pulleys, particularly as used with an automotive internal combustion engine. A planar light source is provided at a reference location associated with the power transmission pulleys, and an illumination plane emitted by the planar light source is allowed to impinge upon the pulleys. Then, correct alignment of the pulleys is determined by comparing the locus of the intersection of the illumination plane with at least one of the pulleys with a locus of intersection of the illumination plane with another of the pulleys.

13 Claims, 4 Drawing Sheets

METHOD AND SYSTEM FOR VERIFYING ALIGNMENT OF POWER TRANSMISSION PULLEYS

BACKGROUND OF THE INVENTION

1. Field of the Invention

The present invention is related to a method and system for assuring the proper alignment of multiple power transmission pulleys, such as those typically found in the front end accessory drives of an automotive internal combustion engines.

2. Related Art

Modern automotive internal combustion engines typically utilize a number of belt driven accessories, such as a power steering pump, an air injection pump, an air conditioning compressor, an a/c generator, and a water or coolant pump. Such accessories are commonly driven by a single flat elastomeric belt, sometimes termed a "serpentine" belt. Serpentine belts typically contact pulleys on both sides of the belt; that is, the belt may be ribbed on one side to fit in grooves formed on certain of the pulleys, while running on the back side of other pulleys having smooth surfaces for engaging the belt.

Proper alignment of drive pulleys is essential if the drive belt is to provide adequate life and reliability. If the alignment of the pulleys is not correct, a belt may be thrown from the pulleys, which could have the effect of causing the engine to stop operating, were the engine to overheat, or were the a/c generator to stop rotating for a sufficient amount of time for the battery to discharge to the point where the engine's electrical needs could no longer be supported. Another problem associated with misaligned pulleys is one of excessive noise, which may cause dissatisfaction in the ranks of motorists experiencing this problem, as well as concomitant expense to the manufacturer and/or the motorist to repair the cause of the excessive noise or squeaking.

U.S. Pat. No. 5,987,762 discloses a pulley alignment gauge which, although marginally useful, is not particularly suited to determining whether companion pulleys are both coplanar and operating upon axes which are mutually parallel, because the emitted light from the device disclosed in the '762 patent is a coherent beam, rather than a plane of light.

It would be desirable to provide a system and method for easily checking the alignment of a multiplicity of drive pulleys associated particularly with an automotive engine so as to ensure proper drive belt life, proper engine integrity, and a low belt noise signature.

SUMMARY OF THE INVENTION

According to an aspect of the present invention, a method for verifying the spatial or planar alignment of a number of power transmission pulleys includes positioning a planar light source at a reference location associated with the power transmission pulleys, and allowing an illumination plane emitted by the planar light source to impinge upon the pulleys. The method also includes verifying correct alignment of the pulleys by comparing the locus of the intersection of the illumination plane with at least one of the pulleys with a locus of intersection of the illumination plane with at least another one of the pulleys.

According to another aspect of the present invention, a planar light source is preferably positioned so as to cause the illumination plane to impinge upon the pulleys in a direction normal to the axes of rotation of the pulleys. The illumination plane itself originates within the planar light source at a single point which is operatively associated with a reference location.

According to another aspect of the present invention, the planar light source preferably comprises a light source distributed by a rotating mirror. The light source may include a laser or other type of light generating device.

According to another aspect of the present invention, the loci of intersection of the illumination plane with pulleys are compared by determining whether offsets exist from a preselected nominal location for such intersections on each pulley.

According to another aspect of the present invention, a reference location for positioning a planar light source may be associated with a front cover of an automotive internal combustion engine.

According to another aspect of the present invention, a system for verifying the planar alignment of a number of power transmission pulleys includes a planar light source for producing an illumination plane, and at least one reference location, configured as a locating surface associated with the power transmission pulleys, for locating the planar light source so as to permit an illumination plane emitted by the planar light source to impinge upon the power transmission pulleys at predetermined locations upon the pulleys. The planar light source may either be held manually in contact with the locating surface, or it could be mounted by means of a threaded fastener or other device upon the locating surface.

It is an advantage of a method and system according to the present invention that coplanar alignment of a number of driving and driven pulleys may be assessed easily without resort to cumbersome mechanical measurement means.

It is another advantage of a method and system according to the present invention that the method may be employed easily and with in-use vehicles at dealerships and other repair facilities.

It is yet another advantage according a method and system of the present invention that collision damaged engines may be repaired properly because misaligned pulleys are readily detectable with the present method and system, without the need for extensive personnel training or instrumentation.

It is another advantage of a method and system according to the present invention that the method may be employed with not only elastomeric belt pulleys, but also with metallic and non-metallic chain pulleys commonly referred to as sprockets.

Other advantages, as well as features of the present invention, will become apparent to the reader of this specification.

DETAILED DESCRIPTION OF THE PREFERRED EMBODIMENTS

Figure 1:
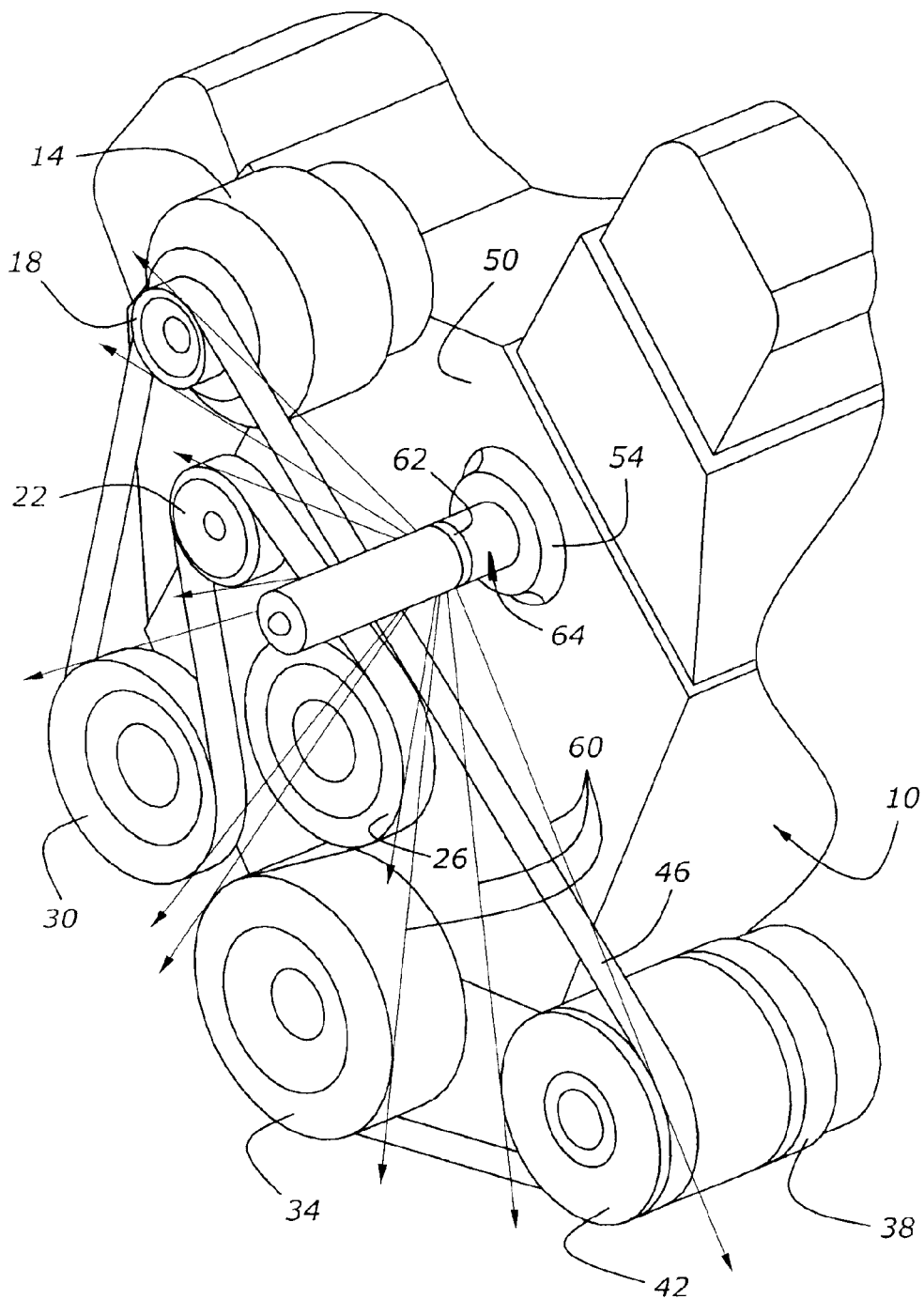
FIG. 1 is a perspective view of an engine having a front end accessory drive which is being analyzed by a laser illuminator according to the present invention.

Referring to the Figures, wherein like numerals indicate like or corresponding parts throughout the several views, as shown in FIG. 1, an engine, 10, has a variety of accessories including an a/c generator, 14, having a pulley, 18, and a tensioner pulley, 22, for tensioning a serpentine belt, 46. Engine 10 also includes a water pump pulley, 26, connected with a water pump (not shown), and a power steering pulley, 30, connected with a power steering pump (not shown). A crank pulley, 34, which is connected with the engine's crankshaft (not shown) provides power for the accessory drive system.

The engine of FIG. 1 also includes an air conditioning compressor, 38, which is driven by a pulley, 42. Some of the rotating accessories are mounted upon a front cover, 50, which also contains a locator pad, 54, for mounting a planar light source, 64, shown in the various Figures.

In use, laser illuminator or planar light source 64 creates a plane or sheet of light, 60, which impinges in a normal direction upon the front edges of all of pulleys 18, 22, 26, 30, 34 and 42, thereby providing a visual indication to a mechanic of any pulleys which are either not coplanar, or axially displaced with offsets existing from a predetermined nominal location. In other words, the intersection of the pulleys with illumination plane, 60, as shown in FIG. 1 is used to determine whether any of the pulleys is not operating in the same plane as other pulleys, or is displaced in any manner from a common plane.

Figure 3:
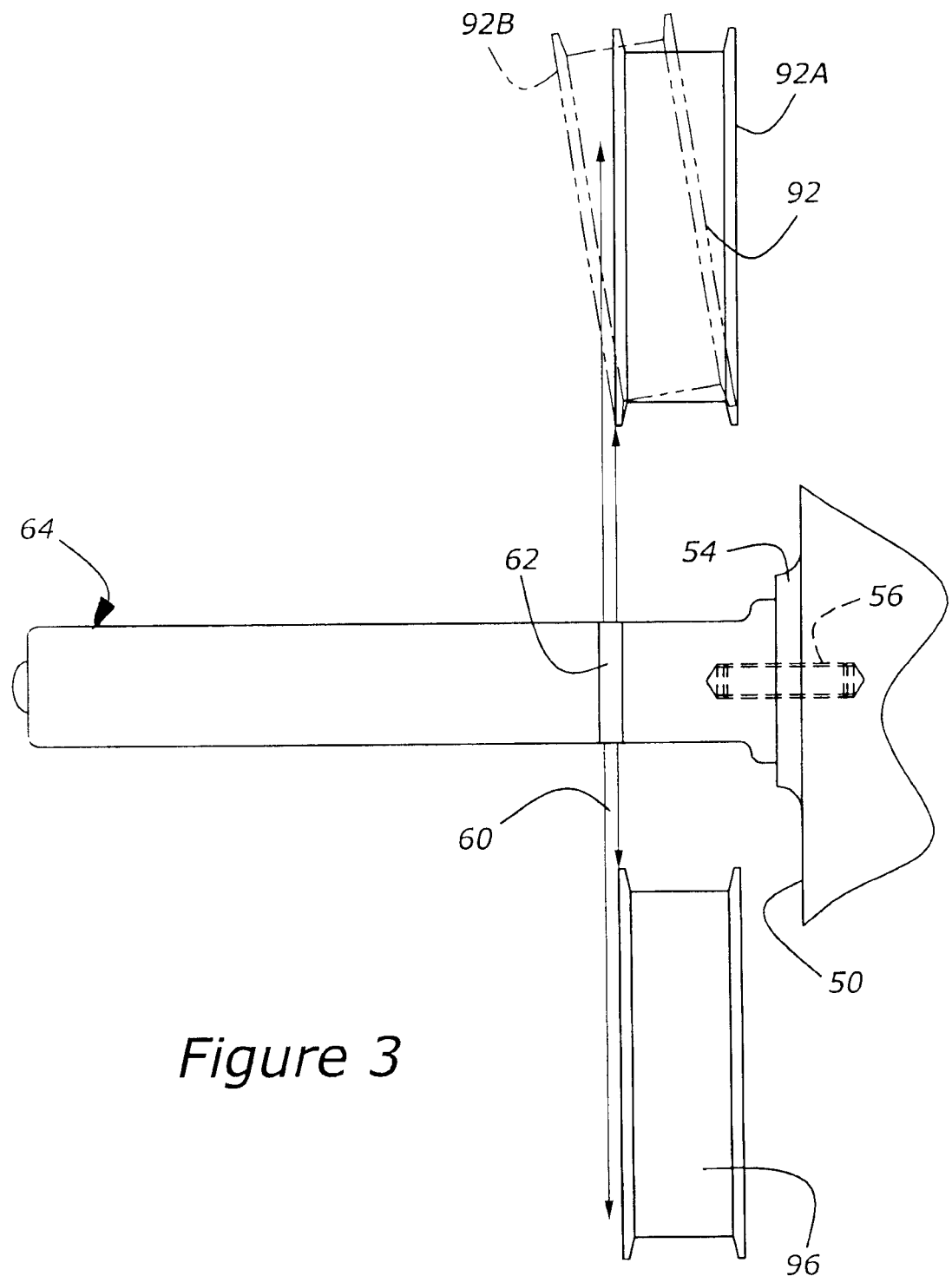
FIG. 3 is a schematic representation of a process for employing a planar light source to detect an out of alignment pulley condition.

As shown schematically in FIG. 3, planar light source 64, having been mounted to locator pad 54 with a threaded fastener 56, is emitting a plane of light, 60, through window 62. Illumination plane 60 impinges upon pulleys 92 and 96 in a direction normal to the axes of rotation of the pulleys. Illumination plane 60 indicates two different things with respect to pulley 92. Thus, with position 92A, pulley 92 is shown as being parallel with pulley 96, but with position 92B, pulley 92 is not parallel with pulley 96, and as a consequence, illumination plane 60 does not illuminate a portion of the outer rim of pulley 92. This uneven illumination is a telltale sign that pulley 92 is not parallel with pulley 96.

Figure 2:
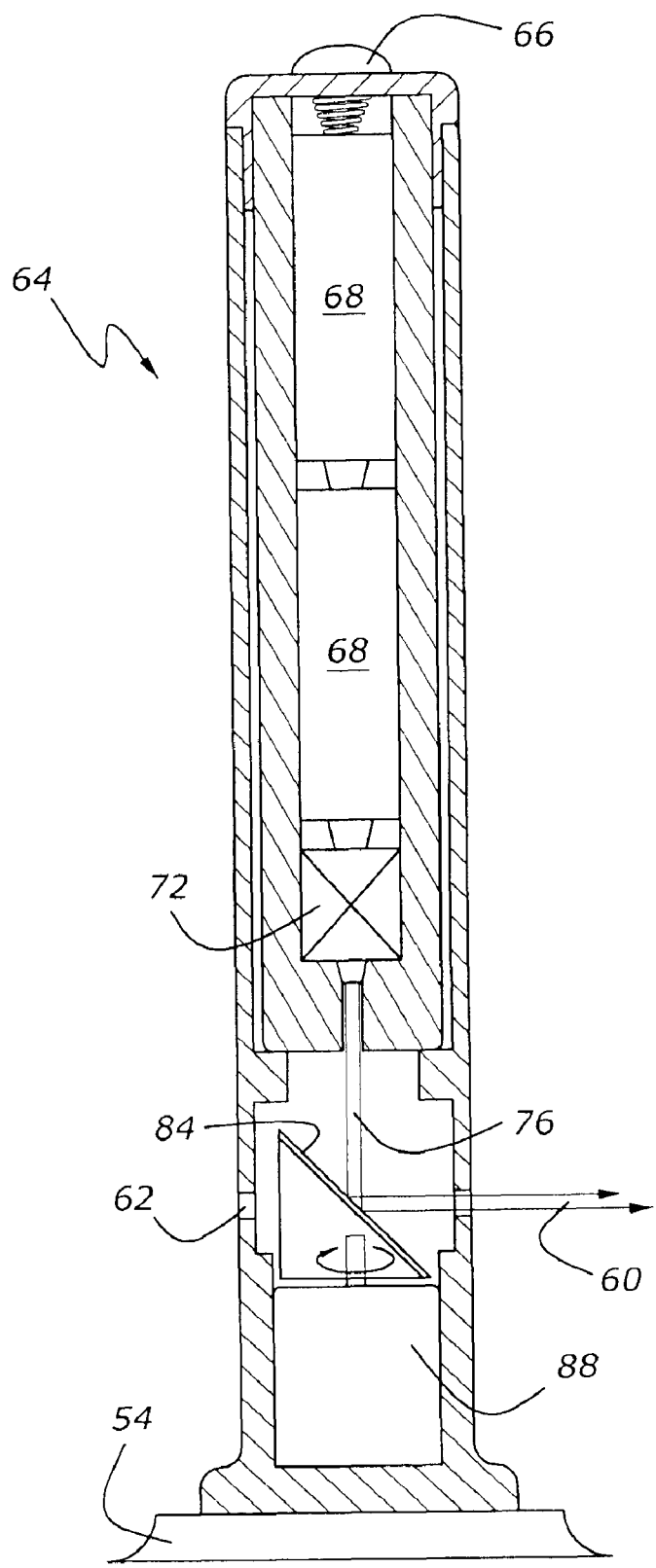
FIG. 2 is a sectional view of a planar light source according to an aspect of the present invention.

FIG. 2 shows a planar light source 64, having an on/off button, 66, and two batteries, 68, driving a laser light source 72, and a motor, 88. When on/off button 66 is placed in the "on" position, energy is provided to a laser light source, 72, as well as to a motor, 88, thereby causing mirror 84 to rotate at a high speed. This causes an illumination plane, (also shown at 60 in FIGS. 1 and 3), to be emitted by planar light source 64 from a single point. Notice also in FIG. 2 that planar light source 64 is in contact with locator pad 54 formed in front cover 50. The precise positioning of planar light source 64 provided by its location upon pad 54 determines a precise dimension for the location of illumination plane 60, which as noted above, shines upon various pulleys such as 18, 30, 34 etc. in a precise location. In other words, a pre-selected nominal location is selected for the intersection of illumination plane 60 with each of the pulleys. This pre-selected nominal location may be either an outer rim of any particular pulley, or an inner rib on the pulley, it being understood that what is important is that a common feature be selected for each of the pulleys. In the event that an outer rim is selected on a pulley, it is possible to use the present method and system even with drive belt 46 installed in some engines. With other engines it will be necessary to remove the drive belt to perform a test using the present device. Those skilled in the art will appreciate in view of this disclosure that planar light source 64 may be powered alternatively by single or multiple power sources such as either the illustrated internal batteries, or by a vehicular power system, or by conventional commercial power.

Once planar light source 64 is switched on, the locus of intersection of illumination plane 60 with at least one of the pulleys may be compared with the loci of intersection of other of the pulleys. By systematically working through the complete assemblage of pulleys a mechanic may determine if any of the pulleys is not coplanar with the other pulleys.

Those skilled in the art will appreciate in view of this disclosure that a planar light source according to the present invention may be constituted either as a laser light source, or may use other type s of illuminating devices. Furthermore, those skilled in the art will appreciate that multiple locator pads 54 may be provided upon either the front cover of an engine or a cylinder block of the engine, or upon yet other engine structural features, so as to permit ready identification of misaligned pulleys. Finally, with the threaded fastener 56 shown in FIG. 3, it is possible to mount planar light source 64 to an engine and then start the engine to safely and conveniently obtain a view of the dynamic operation of drive belt 46 and the various pulleys of the accessory drive system.

Figure 4:
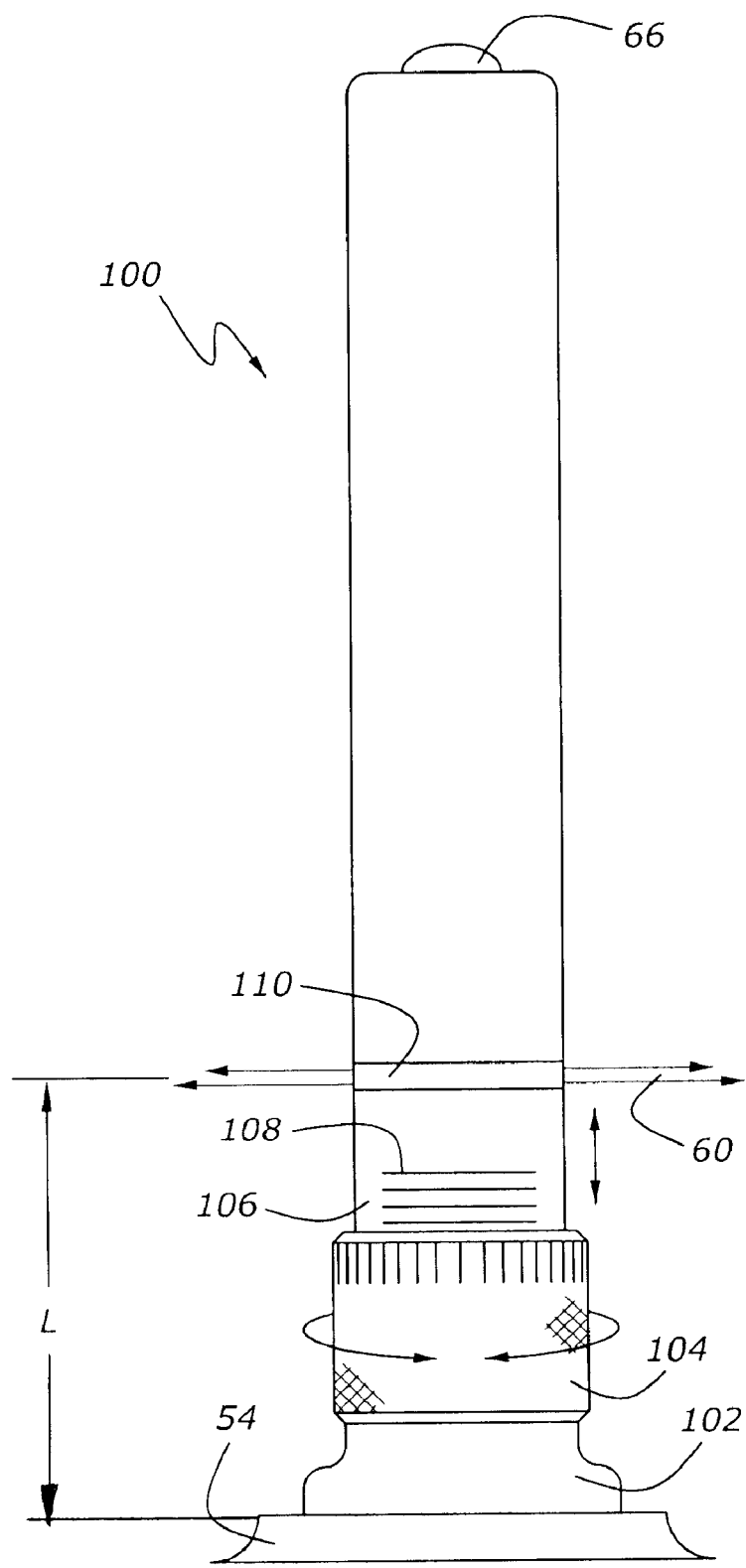
FIG. 4 is an elevational view of a modified planar light source according to an aspect of the present invention.

In the embodiment of FIG. 4, a micrometer adjustment, 104, 108 is provided for light source 100. As knob 104 is rotated manually with respect to base 102, the distance, L, between light window 110 and base 102 is adjusted as barrel 106 moves either closer to, or further away from, base 102. The correct placement of any particular pulley may be verified with reference to locator pad 54 by simple manual manipulation of the micrometer adjustment sufficient to bring any particular pulley into registry with illumination plane 60.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method for verifying the spatial alignment of a plurality of power transmission pulleys, comprising:
    positioning a planar light source at a stationary reference location associated with a plurality of power transmission pulleys;
    directing an illumination plane emitted by the planar light source so as to cause the illumination plane to impinge upon said pulleys; and
    verifying correct alignment of said pulleys by comparing the locus of the intersection of said illumination plane with at least one of said pulleys with the locus of intersection of said illumination plane with at least another one of said pulleys.

2. A method according to claim 1, wherein said planar light source is positioned so as to cause the illumination plane to impinge upon said pulleys in a direction normal to the axes of rotation of said pulleys.

3. A method according to claim 1 wherein illumination plane originates within said planar light source at a single point.

4. A method according to claim 1 wherein illumination plane originates within said planar light source at a single point operatively associated with said reference location.

5. A method according to claim 1, wherein said planar light source comprises a light source distributed by a rotating mirror.

6. A method according to claim 5, wherein said rotating mirror is driven by a motor.

7. A method according to claim 5, wherein said light source comprises a laser.

8. A method according to claim 1, wherein the loci of intersection of the illumination plane with the pulleys are compared by determining whether offsets exist from a preselected nominal location for such intersections on each pulley.

9. A method according to claim 1, wherein said reference location is associated with a front cover of an automotive internal combustion engine.

10. A method for determining the planar alignment of a plurality of power transmission pulleys, comprising:

positioning a planar light source at a stationary reference location associated with a plurality of power transmission pulleys, so as to cause an illumination plane emitted by the planar light source to impinge upon said pulleys in a direction normal to axes of rotation of said pulleys;

directing an illumination plane emitted by the planar light source to cause the illumination plane to impinge upon said pulleys while they are rotating; and verifying coplanar alignment of said pulleys by comparing the locus of the intersection of said illumination plane with at least one of said pulleys with the locus of intersection of said illumination plane with at least another one of said pulleys.

11. A method according to claim 10, wherein said illumination plane originates within said planar light source at a single point operatively associated with said reference location.

12. A method according to claim 10, wherein said planar light source comprises a laser light source distributed by a rotating, motor-driven mirror.

13. A method according to claim 10, wherein said reference location is associated with a front cover of an automotive internal combustion engine.

* * * * *